March 1, 1955 W. S. McEWAN 2,703,010
LIGHTWEIGHT COMBUSTION BOMB AND BOMB PRESSURIZER
Filed April 26, 1954 2 Sheets-Sheet 1

INVENTOR.
WILLIAM S. MCEWAN
BY
*G. D. O'Brien*
ATTORNEYS

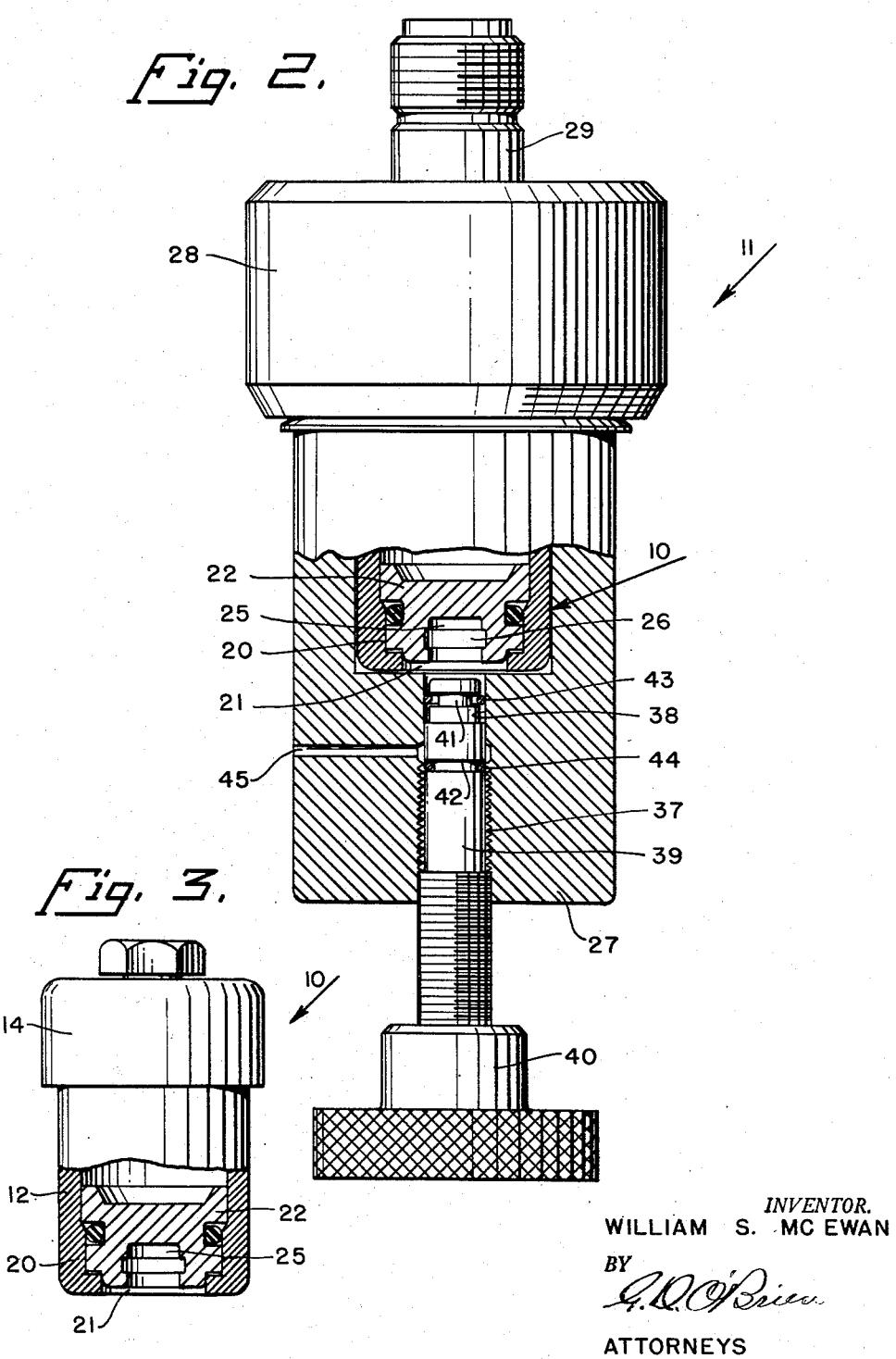

United States Patent Office 2,703,010
Patented Mar. 1, 1955

2,703,010

LIGHTWEIGHT COMBUSTION BOMB AND BOMB PRESSURIZER

William S. McEwan, China Lake, Calif.

Application April 26, 1954, Serial No. 425,772

11 Claims. (Cl. 73—191)

(Granted under Title 35, U. S. Code (1952), sec. 266)

The invention described herein may be manufactured and used by or for the Government of the United States of America for governmental purposes without the payment of any royalties thereon or therefor.

The present invention relates to calorimetric apparatus and has more particular reference to an improved lightweight bomb calorimeter and pressurizer therefor.

In making calorimetric measurements utilizing bomb calorimeters, the latter, after disposition of a test sample therein and pressurizing thereof, is immersed in a liquid of known quantity and the rise of temperature of the liquid, resulting from combustion of a test sample within the bomb, is measured whereby to enable the heat of combustion of the test sample to be calculated. To permit an accurate determination to be made of the heat combustion of a test sample, it is necessary that the transfer of heat of combustion from the bomb to the liquid be affected quickly so as to substantially reduce inaccuracies arising from radiation and other losses, and that the rise in temperature of the liquid be of such magnitude as to make the percentage error in the final calculations a minimum.

Heretofore, numerous bomb calorimeter arrangements have been proposed. Such prior arrangements, however, have not been suitable for use where only relatively minute amounts of the test sample are available. Thus, owing to the excessive mass and hence heat capacity of the prior calorimeter systems, the heat transfer time factor was relatively high and the small amount of heat generated during the combustion of such minute test samples produced only a small rise in temperature of the relatively great mass of liquid necessarily employed in the prior bomb calorimeters with the result that heat of combustion measurements with the result that heat of combustion measurements with an accuracy of the order demanded in certain micro-calorimetric applications were not possible.

The increased mass and heat capacity of the prior bomb calorimeter devices was due, primarily, to the valving arrangement necessary for pressurization of the bomb and which was generally integrally formed with the bomb. This valving arrangement projected from the surface of the bomb and added to the heat capacity of the calorimeter system by increasing the mass of the bomb and by virtue of the greater amount of water required to cover the projecting valves.

The present invention provides an improved bomb calorimeter device wherein the valving mechanism necessary for bomb pressurization is formed on a separate pressurizing apparatus which is detachable from the bomb after pressurization of the latter whereby to provide a bomb calorimeter of reduced mass and heat capacity and hence a calorimetric system of reduced mass and heat capacity so as to permit heat of combustion measurements involving minute quantities of test samples with an accuracy heretofore impossible.

In accordance with the foregoing, it is an object of the present invention to provide an improved lightweight bomb calorimeter and pressurizer therefor.

Another object of the invention is to provide an improved bomb calorimeter having reduced mass and heat capacity whereby to enable accurate determinations to be made of the heats of combustion of relatively minute test samples.

Still a further object of the invention is to provide an improved lightweight bomb calorimeter and pressurizer therefor wherein the valving mechanism necessary to pressurization of the bomb is contained primarily on the pressurizer which is detachable from the bomb element after pressurization of the latter whereby to provide a bomb calorimeter of reduced mass and heat capacity so as to permit accurate determinations of the heats of combustion of relatively minute test samples.

Other objects and many of the attendant advantages of the present invention will become apparent as the same becomes better understood from the following detailed description had in conjunction with the annexed drawings wherein:

Fig. 2 is an elevational view, partially in section, of the bomb and pressurizer of Fig. 1 with the parts thereof shown as they appear after pressurization of the bomb and immediately prior to removal of the bomb from the pressurizer; and Fig. 3 is an elevational view partially in section of the calorimeter bomb of the present invention.

Figure 1:
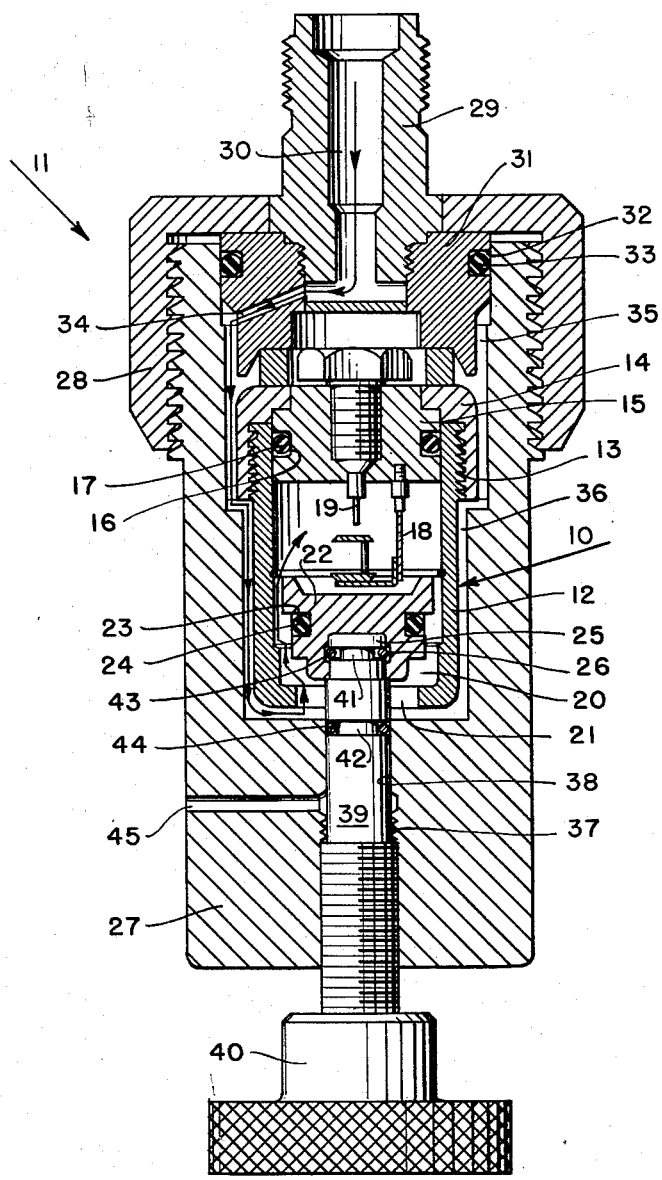
Fig. 1 is a longitudinal sectional view of one embodiment of the present calorimeter bomb and pressurizer therefor with the parts thereof shown as they appear during pressurization of the bomb.

Referring now to the drawings, the disclosed embodiment of the present invention comprises, generally, a calorimeter bomb 10 and pressurizing apparatus 11 therefor. Calorimeter bomb 10 includes a cylindrical shell 12 which is externally threaded at 13 to receive a threaded flanged sleeve 14 the flange of which engages an annular shoulder formed in a cylindrical plug member 15 which serves to close the upper end of shell 12 and which is provided with a peripheral channel 16 in which is disposed an O-ring 17 for providing a gas-tight seal between the plug 15 and shell 12. Closure plug 15 carries conventional test sample supporting means 18 and sample ignition means 19. The lower end of shell 12 is provided with a reduced internal diameter portion 20 and a further reduced diameter lower end opening 21. Slidably disposed within shell 12 is a lower end closure member 22. Closure member 22 is provided with an enlarged upper portion having a diameter slightly less than the major internal diameter of shell 12, an intermediate portion having a diameter slightly less than the diameter of reduced portion 20, and a lower portion having a diameter slightly less than that of opening 21. Closure 22 is adapted to be selectively positioned as shown in Fig. 1 during pressurizing of the bomb and as shown in Figs. 2 and 3 after pressurizing of the bomb, as will be hereafter described. The annular clearance space between closure 22 and shell 12 have, in Fig. 1, been somewhat exaggerated to permit a clear showing of the path followed by the gas during pressurization of the bomb. In Fig. 2 the parts have been shown more clearly as they would appear in the actual construction. Closure 22 is, at its intermediate portion, provided with an annular channel 23 for receiving an O-ring 24 which in the position of the closure member shown in Fig. 2, sealingly engages the reduced diameter portion 20 whereby to provide a gas-tight seal between closure 22 and shell 12. Closure 22 is provided with an axially extending recess 25 opening through the lower end thereof and the wall of which is annularly recessed as at 26 and is for a purpose to be later described. Pressurizing apparatus 11 comprises a generally cup-shaped member 27 which opens through and is externally threaded at its upper end, as shown. Threadedly secured to the upper end of cup member 27 is a flanged sleeve member 28 which carries a fitting 29, provided with flow passages 30, as shown, and which is adapted to be connected to a source of pressurizing gas, not shown. Threadedly secured to the lower end of fitting 29 and engaging the flange of sleeve 28 is a closure plug 31 which is slidably received within the upper end of cup member 27 and which is provided with a annular channel 32 for receiving an O-ring 33 which, in the assembled position of the parts, provides a gas-tight seal between closure 31 and cup member 27. Closure 31 is provided with radially extending passages 34 which communicate with the flow passages 30 in fitting 29. The cavity formed in cup member 27 has an enlarged portion 35 and reduced portion 36 the diameter of which portions are, respectively, slightly larger than the diameter of flanged sleeve 14 and shell 12 whereby to provide an annular clearance space between bomb 10 and the wall of the cavity in cup member 27 which annular clearance space, provides a flow path for the pressurizing gas and is exaggerated as shown in Fig. 1 for the sake of clarity. Extending axially through the lower end of member 27 is a bore having a threaded portion 37 and a smooth portion 38 for receiving a stem 39 having smooth and threaded portions, as shown, for engagement with the corresponding portions in said bore. Stem 39 is, at its lower end, provided with an operating handle 40 to permit rotation of stem 39 and at its upper end with a pair of annular channels 41 and 42. Seated in channel 41 of stem 39 is a resilient split ring 43 which, in the position of the parts shown in Fig. 1, is partially received within the channel 26 in closure 22 whereby to detachably secure the stem 39 and closure 22 together. Disposed within channel 42 of stem 39 is a resilient O-ring 44 which sealingly engages the wall of the smooth bore portion 38. Communicating the bore to atmosphere is a transversely extending passage 45.

In operation of the present device, the calorimeter bomb 10 is removed from the pressurizing apparatus 11, and, by itself, appears as shown in Fig. 3. The flanged sleeve 14 and closure 15 are removed from shell 12 and the test sample whose heat of combustion is to be measured is placed on the supporting means 18. The sleeve 14, closure 15, and shell 12 are reassembled as shown in Fig. 3, and the calorimeter bomb is disposed within the cavity formed in pressurizing apparatus 11. After assembly of the cap member 28 and fitting 29 on the cup-shaped member 27, stem 39 is rotated to bring the latter into contact with closure member 22 and further rotated to bring the parts to the position illustrated in Fig. 1. Fitting 29 is connected to a source of pressurizing gas (not shown) and gas under pressure is admitted to the interior member 27 whereupon it will follow the flow path indicated whereby to pressurize the interior of the calorimeter bomb. After the pressure of the gas in bomb 10 has been raised to a desired value, stem 39 is withdrawn causing closure 22 to move into sealing engagement with the shell 12 of the calorimeter bomb. The pressure of the gas trapped in bomb 10 will act to retain closure 22 in its closed position. After shutting off of the pressurizing gas supply, stem 39 is further withdrawn until the O-ring 44 is positioned below passage 45 whereby the excess pressurizing gas between the calorimeter bomb and the pressurizing apparatus 11 will be permitted to escape to atmosphere. Cap 28 is now disassembled from member 27, the calorimeter bomb removed, and the latter placed in the conventional liquid bath for heat of combustion measurements. Depressurizing of the bomb 12 is accomplished by reassembly of the bomb within the pressurizing apparatus and operation of the stem 39 to move the closure member 22 to its open position, shown in Fig. 1, whereby to permit the gas within the bomb to escape through the fitting 29.

Obviously many modifications of the present invention are possible in the light of the above teachings. Thus, the pressurizing apparatus may be made in the form of a cup-shaped member which receives only the end portion of the bomb having the opening 21 formed therein. The cup-shaped member would carry adjacent its open end, a seal ring which engages the outer surface of the bomb whereby to form a gas-tight joint between the bomb and pressurizing apparatus. The bomb and pressurizing apparatus would, for example, be removably secured together by means of a flanged annular sleeve through which the other end portion of the bomb would project, which sleeve would be removably secured to the open end of the pressurizing apparatus, as by threads, with the sleeve flange engaging a shoulder on the bomb for preventing axial separation of the bomb and apparatus. The threaded stem 39 would extend axially through the wall of the cup-shaped member, as in the modification illustrated, and the fitting 29 would be carried by the cup-shaped member rather than by a removable end closure as shown. Such an arrangement would permit a reduction in the size and weight of the pressurizing apparatus as might be desirable when the bomb is relatively large. It is therefore to be understood that within the scope of the appended claims, the invention may be practiced otherwise than as specifically described herein.

What is claimed is:

1. In combination a bomb calorimeter comprising a container having an opening through the wall thereof, and closure means selectively disposable in a closed position wherein said means seals said opening so as to form a gas-tight unit, and in an open position wherein communication is provided between the interior and exterior of said container by said opening; and a hollow pressurizing apparatus for said bomb adapted to receive at least the portion of said bomb container having said opening formed therein and including a fitting for connection to a high pressure gas source whereby gas under pressure may be introduced into the interior of said apparatus, and means carried by said apparatus and operable externally of the latter for selectively positioning said first mentioned closure means in said open position whereby to communicate the interior of said bomb to the interior of said apparatus, and in said closed position whereby pressurized gas may be trapped within said bomb.

2. In combination, a bomb calorimeter comprising a container having an opening through the wall thereof, and closure means selectively disposable in a closed position wherein said means seals said opening so as to form a gas-tight unit, and in an open position wherein communication is provided between the interior and exterior of said bomb by said opening; and pressurizing apparatus comprising a gas-tight container including a removable closure whereby said bomb may be disposed within said apparatus, a fitting carried by said apparatus and adapted to be connected to a source of pressurized gas whereby gas under pressure may be introduced into the interior of said apparatus, and means carried by said apparatus and operable externally of the latter for selectively positioning said first mentioned closure means in said open position whereby to communicate the interior of said bomb to the interior of said apparatus, and in said closed position whereby pressurized gas may be trapped within said bomb.

3. The arrangement according to claim 2 wherein said bomb includes test sample support and ignition means.

4. The arrangement according to claim 2 wherein said bomb container comprises a cylindrical shell formed with said opening at one end thereof and having a portion of reduced internal diameter adjacent said one end, said first mentioned closure means comprising a cylindrical member axially movable within said shell, said member in the closed position thereof sealingly engaging said reduced diameter portion.

5. The arrangement according to claim 4 wherein said member includes a resilient seal ring.

6. The arrangement according to claim 5 wherein said opening is of lesser diameter than said reduced portion whereby to define an inwardly facing shoulder at said one end of said shell, said member in its closed position engaging said shoulder, pressure of gas within said shell acting to maintain the member in its closed position.

7. The arrangement according to claim 2 wherein said externally operable means comprises a stem extending through and threadedly engaged with the wall of said apparatus container and adapted to be extended into engagement with said first mentioned closure means by rotation of the stem for moving said first mentioned closure means to a selected one of said positions.

8. The arrangement according to claim 7 and a seal ring carried by said stem and slidably engaging the wall of the apparatus container, and a passage communicating the threaded opening receiving said stem to atmosphere, said seal ring being disposed between said passage and interior of the apparatus container when said stem is in engagement with the first mentioned closure means and adapted to be disposed beyond said passage upon withdrawal of the stem whereby to provide communication between the interior of said apparatus container and atmosphere.

9. Pressurizing apparatus for a calorimeter bomb comprising a cup-shaped member adapted to receive said bomb, a removable closure for the open end of said member, a fitting carried by said apparatus and adapted to be connected to a source of pressurized gas whereby to permit the introduction of gas under pressure into the interior of said apparatus, and a spindle extending through and threadedly engaged with the wall of said member whereby said spindle may be moved axially by rotation thereof externally of said apparatus.

10. Apparatus according to claim 9 wherein said spindle carries a resilient seal ring which slidably engages the wall of said member, said member having a passage communicating the threaded opening receiving said spindle to atmosphere, said seal ring being adapted to be disposed to one side or the other side of said passage upon axial movement of said spindle.

11. A bomb calorimeter comprising a cylindrical shell open at both ends, a removable closure sealing one end of the shell, said closure being removable to permit the insertion of a test sample into the shell, said shell including a portion of reduced internal diameter adjacent the opening on its other end, the diameter of the last mentioned opening being less than said reduced portion whereby to define an inwardly facing shoulder at said end, and a closure member axially movable within said shell from a closed position wherein said member engages the shoulder and sealingly engages said reduced portion, to an open position wherein said member is spaced from the reduced portion and shoulder and communication is provided between the interior and exterior of said shell.

References Cited in the file of this patent

FOREIGN PATENTS

| | | |
|---|---|---|
| 550,002 | France | Dec. 4, 1922 |
| 687,938 | Great Britain | Feb. 25, 1953 |